INVENTORS
FRANK J. PILIA
GERALD J. DUDDY, JR.
BY Barnwell R. King
ATTORNEY

April 7, 1964 F. J. PILIA ETAL 3,128,369
ELECTRIC ARC WELDING APPARATUS
Filed Nov. 29, 1961 2 Sheets-Sheet 2

INVENTORS
FRANK J. PILIA
GERALD J. DUDDY JR.

BY Barnwell R. King
ATTORNEY

United States Patent Office 3,128,369
Patented Apr. 7, 1964

3,128,369
ELECTRIC ARC WELDING APPARATUS
Frank J. Pilia, West Orange, and Gerald J. Duddy, Jr., Newark, N.J., assignors to Union Carbide Corporation, a corporation of New York
Filed Nov. 29, 1961, Ser. No. 155,611
4 Claims. (Cl. 219—127)

This invention relates to work-in-circuit electric arc welding, and more particularly to a consumable (wire) electrode, inert gas shielded, mechanized spot welding torch.

The invention provides a mechanized inert gas shielded consumable electrode spot welding torch for work-in-circuit electric arc welding, which comprises, in combination, a slide assembly, a feed roll assembly, a replaceable torch cartridge and a torch housing. Such slide assembly includes a shock absorber for preventing damage to the torch when mechanically advanced to compress the work to be spot welded. The feed roll assembly is mounted on said slide assembly and includes aligned electrode wire guides which are spaced axially of the path of such wire, and wire feed rolls mounted on opposite sides of such path, and quick release means supporting one of said rolls for facilitating repair of burnbacks and wire "hang-ups." The torch cartridge and housing are connected together in axial alignment with such wire path, by means including a quick release clamp on said feed roll assembly engaging said cartridge. The torch housing includes passages through which cooling water can circulate between mating inlets and an outlet at the juncture between said cartridge and torch housing assembly and valves therein which are opened when said cartridge and housing assembly are connected, and closed when said cartridge is removed from such housing assembly.

Increased use of consumable electrode electric arc spot welding over the past few years has led to a desire by industry to automate the process in a number of high production applications. Welding power supplies and control apparatus being marketed for manual consumable electrode spot welding are readily adaptable for mechanized operation. Torches for manual arc spot welding, on the other hand, are not suitable for mechanized use. For ease of handling, manual torches are usually of the shape of a pistol, a configuration that does not readily lend itself to the rigid fixturing required in an automatic machine. Furthermore, since a spot welding torch is held directly against the workpiece, a load is usually applied through the torch to aid in holding in intimate contact the pieces being welded together. In manual welding this load is applied by the welding operator, but in mechanized welding it is applied by the machine and is normally many times greater than that applied manually. Manual spot welding torches which are designed to withstand the load of a human operator would quickly fail under the forces of machine welding.

Mechanized torches for continuous welding could also be converted for spot welding use by replacing the shielding nozzle with a spot welding nozzle. These, however, in normal use do not ordinarily contact the workpiece and thus, are not designed to withstand compressive loads. Like manual spot welding torches, they would fail under the load stresses of mechanized consumable electrode arc spot welding.

In addition to the lack of a suitable machine torch, process difficulties have limited consumable electrode electric arc spot welding to manual operation. "Hang-up" of the welding wire in the feed mechanism and burnbacks occur frequently. These are especially troublesome when welding aluminum. This is partly due to the poor arc starting characteristic of aluminum wire but also because of inherent difficulty in feeding a comparatively soft wire which is easily scored and chipped in the wire feed rolls. For example, it is not uncommon when spot welding aluminum for one or two burnbacks or wire "hang-ups" to occur in every 100 welds. Each of these malfunctions may require from two to five minutes of an operator's time in order to clear it before welding can be resumed. Objectionable though it may be, this condition has been tolerated in manual spot welding operations. In a mechanized operation, however, where a number of torches may be used in the same installation, such a condition would be prohibitive. In an automatic operation production rates must be consistently high in order to justify the capital investment in equipment. With a burnback rate as great as that in manual spot welding down time for an automatic installation would be excessive and mechanization would not be economically feasible.

The main object of the present invention is to provide a torch that is suitable for consumable electrode electric arc spot and also continuous welding in mechanized installations.

Another object is to provide a spring loaded slide integral with the torch body for the purpose of applying a controlled hold-down pressure to the workpiece.

A further objective is to provide a feed roll assembly integral with the torch to minimize wire feed difficulties and thus reduce the occurrence of burnbacks and wire "hang-ups."

Still another object is to provide a quick release wire pressure roll and a readily replaceable torch cartridge to facilitate repair of burnbacks and wire "hang-ups."

Still another object is to provide direct water-cooling to the heavy-duty nozzle to reduce the accumulation of spatter and thereby minimize the down time required for its removal.

According to the invention there is provided an inert gas shielded, consumable electrode mechanized spot welding torch assembly which includes, in combination, the following components:

(1) A shock absorbing spring loaded slide for applying a controlled hold-down pressure to the workpiece.

(2) An integral feed roll housing with a quick release pressure roll which minimizes wire feed difficulties and facilitates repair of burnbacks and wire "hang-ups."

(3) A replaceable torch cartridge with a quick release mechanism to minimize down time for torch repair.

(4) Automatic water shut-off valves which eliminate the need for disconnecting the water supply when replacing torch cartridges.

(5) Direct water cooling of a heavy-duty gas shielding nozzle to minimize down time for removal of weld spatter.

In the present invention rugged construction is combined with ease and simplicity of repair to provide a torch suitable for consumable electrode electric arc spot welding in a mechanized installation. The features of this invention which help to reduce work stoppages resulting from various process difficulties may be more readily understood by referring to the drawings in which.

Figure 1:
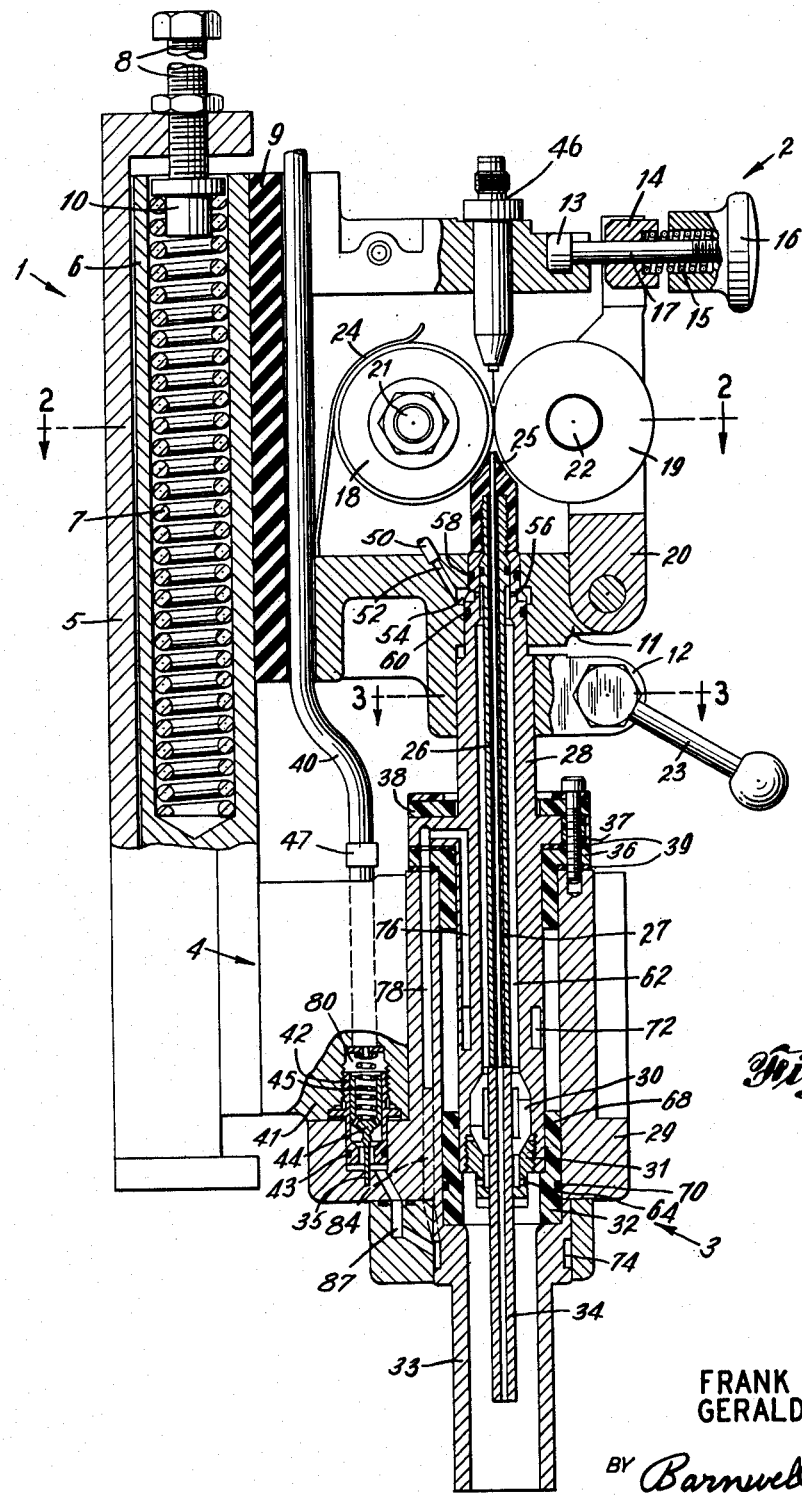
FIG. 1 is a longitudinal cross-section view taken along the longitudinal axis of the torch.

The mechanized inert gas shielded consumable electrode torch shown in FIG. 1 consists essentially of four subassemblies which includes slide assembly 1, feed roll assembly 2, replaceable torch cartridge 3, and torch housing 4.

Side assembly 1 includes a slide bed 5, saddle 6, slide spring 7, hold-down force adjusting screw 8, feed roll housing insulator block 9, and spring guide 10. The slide assembly 1 not only houses the spring loaded slide, but also serves as a mounting bracket for fastening the torch to a welding machine. The saddle 6, rides in the dove-tailed groove of slide bed 5 and is free to move vertically about 1 in. It is limited in its travel by the top and bottom plates of slide bed 5.

To provide complete control of hold-down pressure on the workpiece, the torch is mounted on the welding machine so that when the torch is moved down into position against the workpiece for welding, the saddle 6 rides up in slide bed 5, but to a point which is somewhat short of its uppermost position in slide bed 5. Were the torch mounted with respect to the work so that when in the welding position saddle 6 rode all the way to the top of slide bed 5, control of hold-down force by means of spring 7 would be lost, since the downward drive of the machine would be transmitted directly through slide bed 5 to saddle 6 and thence to the torch, thus by-passing spring 7.

By properly mounting the torch with respect to the workpiece as described above hold-down force is controlled by means of spring 7. This hold-down force is proportional to the amount spring 7 is compressed when saddle 6 rides upwards in slide bed 5 due to the torch being driven down onto the workpiece by the machine. This, of course, is a fixed amount, depending on the spacial relationship between the machine, the torch, and the workpiece. To this force is added the compressive load which is preset on spring 7 prior to welding. This load is selected by manually setting the hold-down force adjusting screw 8. This screw acts through spring guide 10 to compress spring 7 to the desired amount. Thus, the controllable preset load on spring 7, together with the added load when it is further compressed by saddle 6 riding up in slide bed 5, combine to provide the desired hold-down force on the workpiece.

Also a part of the slide assembly is the feed roll housing insulator block 9. This block is the mounting plate for feed roll assembly 2 and it also serves the purpose of insulating the feed roll housing from the remainder of the welding machine.

The feed roll assembly 2 is provided as an integral part of the torch. This is done in order to eliminate the flexible conduit between the outlet from the feed roll and the inlet to the torch. Thus, the wire is fed through a straight line path from the feed roll to the contact tip, which distance is maintained as short as possible. By so doing, a major source of wire feeding difficulty is eliminated. In addition, the wire feed roll unit is provided with means for controlling the pressure on the wire between the feed roll and the pressure roll, as well as a quick release mechanism on the pressure roll to permit rapid clearing of wire hang-ups.

Figure 2:
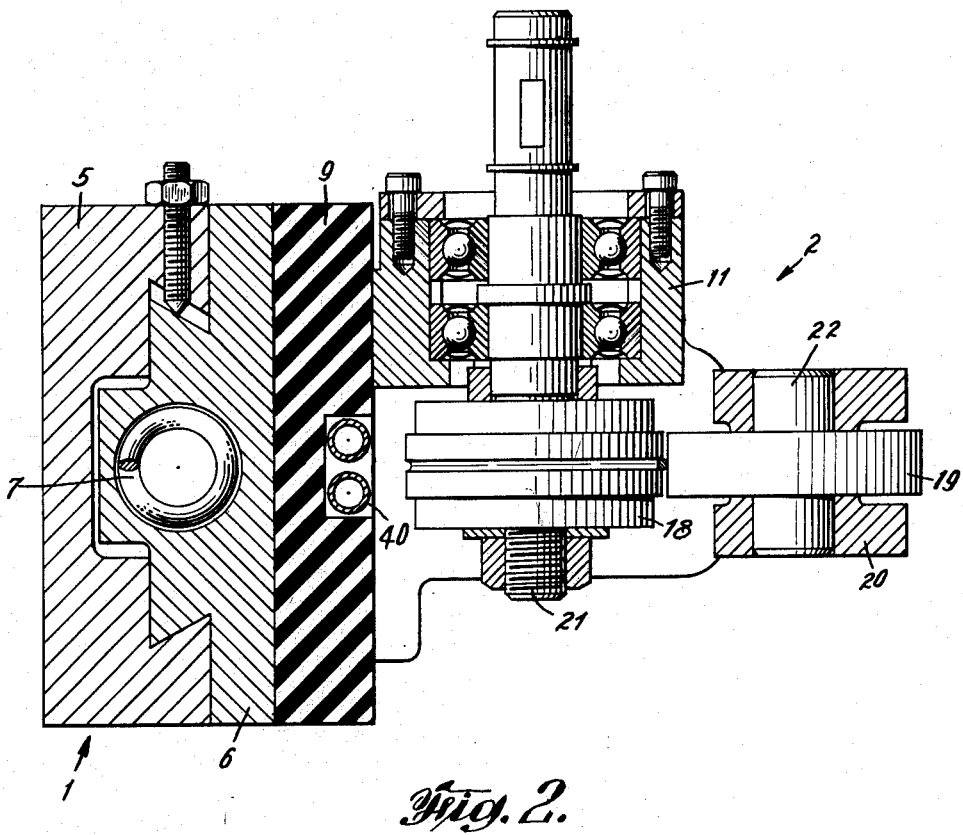
FIG. 2 is a view in horizontal section along line 2—2 of FIG. 1.

The feed roll assembly 2 is shown in FIGS. 1 and 2. The welding electrode enters through a wire inlet guide 46 in the top of the housing 11, and is fed to the arc by feed roll 18 which is driven by shaft 21, which in turn is coupled to a governor controlled electric motor not shown. Pressure between the wire and the feed roll is maintained by prsesure roll 19 which is free to rotate on shaft 22. The pressure roll 19 and its shaft 22 are supported in pressure roll clapper 20. This clapper is hinged at its lower end where it is mounted on the feed roll housing body 11. This is done so that the pressure roll can be swung away from the feed roll to facilitate clearing wire "hang-ups" and rethreading the wire when "hang-ups" occur. At the upper end of clapper 20 is a pivot block 14 which is mounted in trunnions between two arms of clapper 20.

Through pivot block 14 passes a pressure roll adjusting screw 17. This screw has, at one end, a knob-like projection 13 which engages a T-slot in the housing body 11 to hold the clapper 20 and pressure roll 19 in position against the wire and the feed roll 18. At the other end adjusting screw 17 is threaded to receive knob 16.

Over adjusting screw 17 and between pivot block 14 and knob 16 is a pressure roll spring 15. By means of this spring the force exerted by pressure roll 19 against the wire and feed roll 18 is achieved. This force can be readily adjusted by screwing knob 16 relative to adjusting screw 17 so as to compress spring 15 to the desired amount then the feed roll is latched in position against the wire.

This arrangement provides not only control of feed roll pressure, but also the quick release feature required for quick repair of wire "hang-ups." To release the pressure roll it is only necessary to push knob 16 inwards and downwards. This rotates adjustment screw 17 so that the projection 13 on its opposite end disengages the T-slot in the housing body 11, permitting clapper 20 and pressure roll 19 to swing down away from the feed roll 21.

Figure 3:
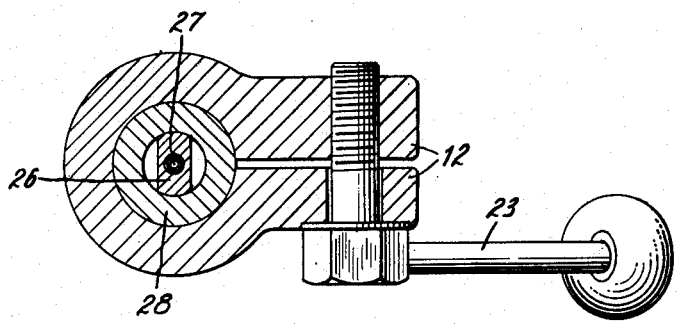
FIG. 3 is a view in horizontal section along line 3—3 of FIG. 1.

Feed roll assembly 2 also includes the quick release mechanism for the replaceable torch cartridge 3. This is shown in FIGS. 1 and 3. When the torch is assembled, the replaceable torch cartridge is locked in place by torch release handle 23. In the bottom of feed roll housing body 11 is a hole to receive the replaceable torch cartridge 3. In addition, there is also provided as part of housing body 11, two projections 12 into one of which is threaded torch release handle 23. When the replaceable torch cartridge is inserted into its receptacle in feed roll housing body 11, clockwise rotation of torch release handle 23 of about a quarter turn squeezes projections 12 together sufficiently to clamp torch cartridge 3 rigidly in position. To release the torch cartridge when it is desired to replace it requires merely to turn handle 23 counter-clockwise about a quarter turn to withdraw the torch from its receptacle.

One other feature provided as an optional part of feed roll assembly 2 is a hot feed roll contact shoe 24. The hub of feed roll 18 is of a non-conducting material, insulating the feed roll from its shaft 21. Thus, under normal conditions when contact shoe 24 is not installed it is impossible for welding power to be delivered to the electrode wire from the feed roll. It may, however, at times be necessary to improve electrical contact between the torch and the electrode in order to minimize any tendency for arcing to occur between the wire and the contact tube, which would result in an unsatisfactory rate of burnbacks. At such times it is possible to improve electrical transfer to the wire by energizing the feed roll 18 with welding power from the feed roll housing 2 by means of contact shoe 24.

The replaceable torch cartridge 3 is shown as the shaded subassembly in FIG. 1. It consists essentially of a torch body 29 into which is mounted a water jacket 28 which is insulated from the torch body at its lower end by insulator sleeve 32 and at the top by torch insulator bushing 36, cap screw insulating bushings 37, and insulating plate 38. Inside water jacket 28 and projecting through its upper end, is a wire guide tube 26. To this is threaded wire outlet guide 25, which extends inside the housing 11 and receives the welding electrode directly from the feed rolls. This outlet guide 25 is made of a thermoplastic material to minimize wire friction and to prevent scoring and chipping the wire. Guide tube 26 is also provided with a liner 27 of thermoplastic material for the same purpose. Finally, the water jacket 28 is also provided with a contact tip 34, collet 30, and collet nut 31. The contact tip 34 is rigidly held in place by collet 30 when the later is compressed against the tapered walls of the water jacket 28 by collet nut 31.

To the front end of torch body 29 is attached a heavy-duty nozzle 33, having water passages and a water chamber for cooling. By providing water-cooling to the nozzle its temperature is maintained sufficiently low even at high production rates that weld spatter does not tend to adhere to its inner wall. As a result, down time for nozzle cleaning is kept to a minimum, by virtue of its mass and the large cross-sectional area of its face, the nozzle 33 is able to withstand the impact of heavy cyclic loads resulting from the application of hold-down pressure to the workpiece during mechanized spot welding operations.

In torch body 29 there are two recessed chambers into which fit the bodies of water shut-off valves when the torch cartridge 3 is assembled with the remainder of the torch. Centered in these recessed chambers in the torch body 29 are two water valve actuating pins 35. Action of both the pins and the valves will be described in a later section on the cooling water system.

A torch housing 4, FIG. 1, supports the lower end of the replaceable torch cartridge 3 and holds it in alignment with the axis of the feed rolls. The main component of this unit is valve body housing 41. This housing 41 contains two water passages which are provided with fittings to which attach the water inlet and drain lines 40. In the lower portion of valve body housing 41, the two water passages terminate in chambers into each of which are inserted a valve body 42 and a water valve plunger 44 which carries O ring 43. These latter parts make up the automatic water inlet and drain shut-off valves which permit the replaceable torch cartridge to be removed without shutting-off the source of cooling water.

Welding power is introduced into the torch by means of a cable from the power supply which is attached to a fitting in the feed roll housing body 11. Power passes from the feed roll housing 11 to the water jacket 28 of replaceable torch cartridge 3 directly at the point where the latter is clamped into the former by quick release handle 23. From water jacket 28 direct electrical contact is established to contact tip 34 through collet 30 and thence to the electrode wire. Such an arrangement facilitates repair and minimizes down time since the replaceable torch cartridge can be removed and replaced without disconnecting the power cable. Welding power can also be transferred directly to the wire from feed roll 18 when hot feed roll contact shoe 24 is installed.

Shielding gas is delivered to the torch through a pipe line which attaches to a fitting 50 in the top of feed roll housing body 11. It then passes through hole 52 to a chamber 54 at the lower end of feed roll housing body 11 where it enters the replaceable torch cartridge 3 through radial holes 56 in the water jacket 28. Aspiration of atmosphere into the shielding gas at this point is prevented by O ring seals 58 and 60 between water jacket 28 and housing body 11, and between water jacket 28 and guide tube 26, respectively. The gas then passes down the space 62 between guide tube 26 and water jacket 28 to the collet 30 which is slotted from both the top and the bottom to provide a continuous path through to the collet nut 31. The gas then passes through holes 64 in the collet nut 31 into the shielding nozzle 33 and in the annular space 66 surrounding the contact tip 34.

Air from the atmosphere is prevented from being aspirated into the shielding nozzle 33 by O rings 68 and 70 which are carried in grooves in the torch insulator sleeve 32. These O rings seal the annular space between torch body 29 and water jacket 28.

It is not necessary to provide means for shutting off the shielding gas flow when removing the torch cartridge 3. In a spot welding operation, shielding gas is controlled by the welding control and is normally set to flow only during each actual welding cycle. Obviously a welding cycle would not be started when the torch cartridge 3 is removed from the torch assembly.

The water cooling system provides cooling not only for the contact tip 34, collet nut 31, and collet 30, but also the shielding nozzle 33 as well. To this end both the water jacket 28 and the nozzle 33 are provided with annular cooling water chambers 72 and 74 which are interconnected in series relationship by means of water passages 76 and 78. Heat transfer from contact tip 34, collet nut 31, and collet 30 is achieved by direct metal to metal contact between these parts and water jacket 28 which promoted conduction of heat to the cooling water.

Cooling water enters the torch through inlet hose 40 which attaches to a fitting 47 on the top of valve body housing 41. Water thence flows down into the water inlet shut-off valve 80, passing through ports in the water valve plunger 44. With the torch fully assembled, the valve actuating pin 35 holds the water valve plunger off its seat, so that the water continues to flow on through the orifice in water valve body 42. From this point it flows through a passage 82 to the annular cooling chamber 74 in the nozzle 33. After circling chamber 74 it exits into vertical passage 84 in torch body 29, from which it passes eventually into the water jacket 28 and its annular chamber 72 where cooling of the contact tip, collet and collet nut is accomplished. Where the water passes from torch body 29 to water jacket 38, gasket seals 39 are provided on each side of torch insulating bushing 36 to prevent leakage.

Cooling water is returned from the water jacket 28 through a second set of passages similar to that on the inlet side of the line, except that the drain line bypasses the shielding nozzle. Passages carry water from the cooling chamber of water jacket 28 directly through torch body 29 to the bottom of a drain shut off valve, not shown, identical to the inlet shut-off valve described above.

When the replaceable torch cartridge 3 is removed, the two water valve actuating pins 35 no longer support the water valve plungers 44 and springs 45 drive the plungers 44 down so that O rings 43 seal the orifices in valve bodies 42 closing the valves. It is necessary to spring load only the drain valve plunger since on the inlet side, water pressure alone is sufficient to close the valve when the torch cartridge is removed.

The features of this torch which have been described above, contribute to minimize down time for torch repair. For example, water cooling to the gas shielding nozzle slows the accumulation of spatter, thus the nozzle need be cleaned much less frequently. In addition, the quick release mechanism and replaceable torch cartridge facilitate repair of burnbacks. When a burnback occurs it is merely necessary to cut the wire and remove the torch cartridge, replacing it with a new one. The burnback contact tip 34 can later be replaced at leisure without interrupting the welding operation. This can all be accomplished without removing or disconnecting any of the supply lines to the torch. Also the provision of a quck release for the pressure roll permits more rapid clearing of the wire in case it hangs up at the feed rolls; thus, further minimizing down time.

Not only have repairs been greatly simplified with the inventive torch, but improved performance with respect to contact tip life has also been achieved. This can in large measure be attributed to the inclusion of the feed roll assembly as an integral part of the torch which permits a short straight-line path with uniform support for feeding the wire from the feed rolls to the contact tip. Another contributary factor in contact tip life is the use of the hot feed roll contact shoe 24 which insures good electrical transfer to the electrode at all times.

What is claimed is:

1. A mechanized inert gas shielded consumable electrode spot welding torch for work-in-circuit electric arc welding, which comprises, in combination, a slide assembly having a mounting bracket with a slide thereon, a wire feed roll casing mounted on said slide and having a socket, a torch housing mounted on said slide and having a bore aligned with said socket, a torch cartridge inserted through said bore into said socket to receive wire from said casing, and means including a handle on said casing for constricting said socket to clamp said cartridge thereon and thereby retain said cartridge in said torch housing bore.

2. A spot welding torch comprising a slide assembly including a shock absorber; a wire feed roll assembly attached to said slide assembly, including a spring loaded wire feed roll and means supporting said roll for quick removal from driving position; a torch housing mounted on said slide assembly, a torch cartridge replaceably mounted in said torch housing and including wire guide means and contact tube means providing a straight path for wire feed by said feed rolls toward work to be spot welded, said torch cartridge including a heavy duty work engaging spot welding nozzle surrounding the outlet end of said wire contact tube, said torch cartridge and said feed roll assembly having mating apertures, and means for delivering arc shielding gas to said feed roll assembly to pass through said mating apertures into said torch for flow out of said nozzle around the site being welded.

3. A spot welding torch comprising a slide assembly having a mounting bracket and a slide, a feed roll assembly having a casing mounted on said slide, a torch housing mounted on said slide adjacent to said casing, and a torch cartridge replaceably mounted in said torch housing, said wire feed roll assembly including a motor driven wire feed roll having an insulating hub journaled in said feed roll assembly, a "hot" spring contact engaging said feed roll for conducting welding current thereto, said wire feed being provided with spaced wire inlet and outlet guide nipples arranged to conduct the wire tangentially of said feed roll said inlet nipple being mounted in said casing and said outlet nipple being mounted on said torch cartridge and projecting into said casing, a spring loaded feed roll mounted opposite said motor driven feed roll, and means supporting said spring loaded feed roll including a pivoted clapper provided with a latch including a spring which also loads said roll.

4. A spot welding torch comprising a slide assembly having a mounting bracket with a slide thereon, a wire feed casing and a cooling water inlet hose mounted on said slide, a torch housing mounted on said slide and having a cooling water fitting connected to said inlet hose, a torch cartridge replaceably mounted in said housing to form a juncture therewith, said torch cartridge including cooling water passages, said cartridge and housing passages having mating apertures at said juncture, and valves in said housing having spring pressed stems engaging registering portions of said cartridge at said juncture.

References Cited in the file of this patent
UNITED STATES PATENTS

| | | |
|---|---|---|
| 2,096,119 | Lensch et al. | Oct. 19, 1937 |
| 2,628,850 | Summerville | Feb. 17, 1953 |
| 2,761,049 | McElrath et al. | Aug. 28, 1956 |
| 2,827,549 | Carlson | Mar. 18, 1958 |
| 2,989,617 | Stepath | June 20, 1961 |
| 3,043,945 | Reis | July 10, 1962 |
| 3,068,351 | Longenecker et al. | Dec. 11, 1962 |

FOREIGN PATENTS

| | | |
|---|---|---|
| 784,943 | Great Britain | Oct. 23, 1957 |